US 012312468B2

(12) United States Patent
Morita et al.

(10) Patent No.: US 12,312,468 B2
(45) Date of Patent: May 27, 2025

(54) SILICONE RUBBER COMPOSITION, SILICONE RUBBER CROSSLINKED BODY, AND SEALANT

(71) Applicant: Sumitomo Riko Company Limited, Aichi (JP)

(72) Inventors: Takahiro Morita, Aichi (JP); Tomohito Seki, Aichi (JP); Yasuyuki Hayasaki, Aichi (JP); Ryosuke Yamaoka, Aichi (JP)

(73) Assignee: Sumitomo Riko Company Limited, Aichi (JP)

( * ) Notice: Subject to any disclaimer, the term of this patent is extended or adjusted under 35 U.S.C. 154(b) by 599 days.

(21) Appl. No.: 17/685,348

(22) Filed: Mar. 2, 2022

(65) Prior Publication Data
US 2022/0186027 A1 Jun. 16, 2022

Related U.S. Application Data

(63) Continuation of application No. PCT/JP2020/028091, filed on Jul. 20, 2020.

(30) Foreign Application Priority Data

Sep. 25, 2019 (JP) .................................. 2019-174080

(51) Int. Cl.
| | |
|---|---|
| C08L 83/04 | (2006.01) |
| C08F 220/30 | (2006.01) |
| C08G 77/00 | (2006.01) |
| C08G 77/20 | (2006.01) |
| C08K 5/00 | (2006.01) |
| C08K 5/14 | (2006.01) |

(52) U.S. Cl.
CPC .......... *C08L 83/04* (2013.01); *C08F 220/301* (2020.02); *C08G 77/20* (2013.01); *C08G 77/80* (2013.01); *C08K 5/005* (2013.01); *C08K 5/14* (2013.01); C08L 2205/02 (2013.01)

(58) Field of Classification Search
CPC .... C08F 220/301; C08F 299/08; C08G 77/20; C08G 77/80; C08K 5/14; C08K 5/134; C08K 5/005; C08L 2205/02; C08L 83/00; C09J 183/04; C09K 3/10

See application file for complete search history.

(56) References Cited

U.S. PATENT DOCUMENTS

| | | | | |
|---|---|---|---|---|
| 4,935,455 | A * | 6/1990 | Huy | ..................... C09D 183/04 528/30 |
| 6,054,518 | A * | 4/2000 | Hayashida | ............. C08K 5/103 264/300 |
| 6,992,225 | B2 | 1/2006 | Grimaldi et al. | |
| 2017/0107415 | A1 * | 4/2017 | Shiono | ..................... B32B 5/02 |

FOREIGN PATENT DOCUMENTS

| | | |
|---|---|---|
| JP | 2004529955 | 9/2004 |
| JP | 2004351613 | 12/2004 |

OTHER PUBLICATIONS

"Office Action of Japan Counterpart Application", issued on Apr. 4, 2023, with English translation thereof, p. 1-p. 5.
Office Action of German Counterpart Application, issued on Feb. 9, 2024, with English translation thereof, p. 1-p. 9.
"International Search Report (Form PCT/ISA/210) of PCT/JP2020/028091," mailed on Oct. 13, 2020, with English translation thereof, pp. 1-4.
"Written Opinion of the International Searching Authority (Form PCT/ISA/237)" of PCT/JP2020/028091, mailed on Oct. 13, 2020, with English translation thereof, pp. 1-6.

* cited by examiner

*Primary Examiner* — Ana L. Woodward
(74) *Attorney, Agent, or Firm* — JCIPRNET

(57) ABSTRACT

Provided is a silicone rubber composition that allows for both the securing of time for filling materials and an improvement in productivity which is achievable due to a short curing time, and that has excellent reproducibility of curing properties. The silicone rubber composition contains (a) an organopolysiloxane having an alkenyl group, (b) a peroxide cross-linking agent, and (c) a heat stabilizer, wherein (c) includes a compound represented by general formula (1). In formula (1), $R_1$ represents hydrogen or a methyl group, $R_2$, $R_3$, $R_4$, and $R_5$, each independently represent a C1-9 alkyl group, and $R_6$ represents hydrogen or a methyl group.

(1)

$$\text{HO}-\underset{R_2}{\underset{|}{\text{C}_6\text{H}_2(R_3)}}-\underset{R_1}{\underset{|}{\text{CH}}}-\underset{R_5}{\underset{|}{\text{C}_6\text{H}_2(R_4)}}-\text{O}-\underset{\text{O}}{\overset{\|}{\text{C}}}-\underset{R_6}{\overset{|}{\text{C}}}=\text{CH}_2$$

5 Claims, No Drawings

SILICONE RUBBER COMPOSITION, SILICONE RUBBER CROSSLINKED BODY, AND SEALANT

CROSS-REFERENCE TO RELATED APPLICATIONS

This application is a Continuation of PCT International Application No. PCT/JP2020/028091 filed on Jul. 20, 2020, which claims priority under 35 U.S.C. § 119(a) to Japanese Patent Application No. 2019-174080 filed on Sep. 25, 2019. The above applications are hereby expressly incorporated by reference, in its entirety, into the present application.

BACKGROUND

Technical Field

The disclosure relates to a silicone rubber composition, a silicone rubber crosslinked body, and a sealant.

Background Art

Peroxide cross-linking agents that crosslink and cure polymers such as silicone rubber are selected in accordance with mold temperatures. Ordinarily, when a peroxide cross-linking agent having a relatively high decomposition temperature is selected, time spent until the beginning of curing becomes long, and time necessary for filling a mold with a material is secured, but time taken until the completion of curing becomes long, and productivity deteriorates. On the other hand, when a peroxide cross-linking agent having a relatively low decomposition temperature is selected, time taken until the completion of curing becomes short, but time spent until the beginning of curing is too short, curing proceeds until the mold is filled with the material, and molding becomes difficult.

Patent Literature 1 discloses a heat stabilizer for organic peroxides. Patent Literature 1 describes that, when a composition of an organic peroxide and a heat stabilizer composed of an N-heterocyclic compound are mixed, the stability of the peroxide during storage improves.

CITATION LIST

Patent Literature

[Patent Document 1]
Japanese Translation of PCT International Application Publication No. 2004-529955

Heat stabilizers composed of an N-heterocyclic compound have a problem of poor dispersibility in silicone rubber and low reproducibility of curing properties.

The disclosure provides a silicone rubber composition that allows for both the securing of time for filling materials and an improvement in productivity which is achievable due to a short curing time and that has excellent reproducibility of curing properties, a silicone rubber crosslinked body, and a sealant.

SUMMARY

A silicone rubber composition according to an embodiment of the disclosure contains (a) an organopolysiloxane having an alkenyl group, (b) a peroxide cross-linking agent, and (c) a heat stabilizer, and the (c) includes a compound represented by general formula (1).

[Chem. 1]

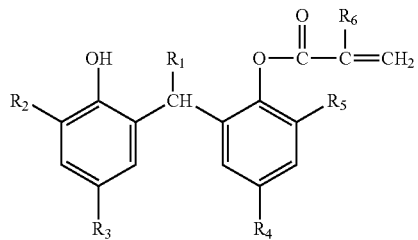

(1)

In formula (1), $R_1$ represents hydrogen or a methyl group, $R_2$, $R_3$, $R_4$, and $R_5$ each independently represent a C1-9 alkyl group, and $R_6$ represents hydrogen or a methyl group.

According to an embodiment of the disclosure, the silicone rubber composition further contains (d) an organopolysiloxane having a phenyl group. According to an embodiment of the disclosure, the (a) includes an organopolysiloxane having an alkenyl group in a side chain. According to an embodiment of the disclosure, the (a) includes an organopolysiloxane having a viscosity at 25° C. of 100,000 mPa·s or higher.

In addition, a silicone rubber crosslinked body according to an embodiment of the disclosure is a crosslinked body of the silicone rubber composition according to the embodiment of the disclosure.

In addition, a sealant according to an embodiment of the disclosure is composed of a crosslinked body of the silicone rubber composition according to the embodiment of the disclosure.

DETAILED DESCRIPTION

According to the silicone rubber composition according to the embodiment of the disclosure, since the silicone rubber composition contains (a) the organopolysiloxane having an alkenyl group, (b) the peroxide cross-linking agent, and (c) the heat stabilizer, and the (c) includes the compound represented by general formula (1), the silicone rubber composition allows for both the securing of time for filling materials and an improvement in productivity which is achievable due to a short curing time and has excellent reproducibility of curing properties.

When the silicone rubber composition according to the embodiment of the disclosure further contains (d) the organopolysiloxane having a phenyl group, the dispersibility of the compound represented by general formula (1) improves, and the reproducibility of curing properties is more favorable. In addition, when the (a) includes an organopolysiloxane having an alkenyl group in a side chain, the curing rate improves, and the productivity improves due to a short curing time. In addition, when the (a) includes an organopolysiloxane having a viscosity at 25° C. of 100,000 mPa·s or higher, a shear force is likely to be exerted during kneading, the dispersibility of the compound represented by general formula (1) improves, and the reproducibility of curing properties is more favorable.

In addition, according to the silicone rubber crosslinked body according to the embodiment of the disclosure, since the silicone rubber crosslinked body is the crosslinked body of the silicone rubber composition according to the embodiment of the disclosure, the silicone rubber crosslinked body allows for both the securing of time for filling materials and an improvement in productivity which is achievable due to a short curing time and has excellent reproducibility of curing properties. In addition, according to the sealant according to the embodiment of the disclosure, since the sealant is composed of a crosslinked body of the silicone rubber composition according to the embodiment of the disclosure, the sealant allows for both the securing of time for filling materials and an improvement in productivity which is achievable due to a short curing time and has excellent reproducibility of curing properties.

Hereinafter, the disclosure will be described in detail.

A silicone rubber composition according to the disclosure contains (a) an organopolysiloxane having an alkenyl group, (b) a peroxide cross-linking agent, and (c) a heat stabilizer, and (c) includes a compound represented by general formula (1).

[Chem. 2]

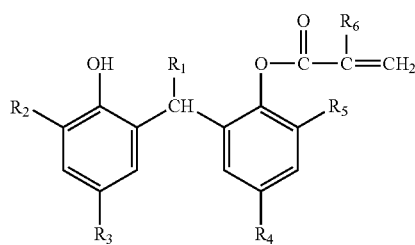

(1)

In formula (1), $R_1$ represents hydrogen or a methyl group, $R_2$, $R_3$, $R_4$, and $R_5$, each independently represent a C1-9 alkyl group, and $R_6$ represents hydrogen or a methyl group.

The organopolysiloxane having an alkenyl group (a) is used as a main raw material (base rubber) of the silicone rubber composition according to the disclosure. As the alkenyl group, a vinyl group, an allyl group, a butenyl group, a pentenyl group, a hexenyl group and the like are exemplified. As the alkenyl group, a vinyl group is more preferable from the viewpoint of an excellent curing rate or the like.

The (a) may be an organopolysiloxane having an alkenyl group in a side chain, may be an organopolysiloxane having an alkenyl group at a single terminal or alkenyl groups at both terminals or may be a combination of an organopolysiloxane having an alkenyl group in a side chain and an organopolysiloxane having an alkenyl group at a single terminal or alkenyl groups at both terminals. When the (a) includes an organopolysiloxane having an alkenyl group in a side chain, the curing rate improves, and the productivity improves due to a short curing time.

The (a) has, in addition to the alkenyl group, an organic group other than an alkenyl group. The organic group is a monovalent substituted or unsubstituted hydrocarbon group. As the unsubstituted hydrocarbon group, an alkyl group such as a methyl group, an ethyl group, a propyl group, a butyl group, a hexyl group or a dodecyl group, an aryl group such as a phenyl group, an aralkyl group such as a β-phenylethyl group or a β-phenylpropyl group and the like are exemplified. As the substituted hydrocarbon group, a chloromethyl group, a 3,3,3-trifluoropropyl group and the like are exemplified. As the organopolysiloxane, ordinarily, an organopolysiloxane having a methyl group as the organic group is frequently used from the viewpoint of easiness in synthesis or the like. The organopolysiloxane is preferably a linear organopolysiloxane, but may be a branched or cyclic organopolysiloxane. The (a) may have a phenyl group or may not have a phenyl group. When the (a) has a phenyl group, in the silicone rubber composition, the dispersibility of the compound represented by general formula (1) improves, and the reproducibility of curing properties is more favorable.

The (a) may be a liquid type, a millable type or both. A liquid-type organopolysiloxane is preferably an organopolysiloxane having a viscosity at 25° C. of 100,000 mPa·s or higher. The viscosity at 25° C. of the liquid-type organopolysiloxane is more preferably 100,000 mPa·s or higher and lower than 1,000,000 mPa·s, still more preferably 150,000 mPa·s or higher and lower than 1,000,000 mPa·s and particularly preferably 300,000 mPa·s or higher and lower than 1,000,000 mPa·s. A millable-type organopolysiloxane is an organopolysiloxane having a viscosity at 25° C. of 1,000,000 mPa·s or higher. The viscosity at 25° C. of the millable-type organopolysiloxane is more preferably 1,000,000 mPa·s or higher and 10,000,000 mPa·s or lower. The millable-type organopolysiloxane is a so-called raw rubber-form (non-liquid-form) organopolysiloxane having no self-fluidity at room temperature (25° C.). When the (a) includes an organopolysiloxane having a viscosity at 25° C. of 100,000 mPa·s or higher, a shear force is likely to be exerted during kneading, the dispersibility of the compound represented by general formula (1) improves, and the reproducibility of curing properties is more favorable. The viscosity at 25° C. is measured using a rheometer "AR2000ex" (manufactured by TA Instruments) and is a value of the shear viscosity at a shear rate of 1 $s^{-1}$.

The peroxide cross-linking agent (b) is appropriately selected in accordance with mold temperatures. The peroxide cross-linking agent (b) preferably has a relatively low decomposition temperature from the viewpoint of an improvement in productivity which is achievable due to a short curing time or the like. More specifically, the peroxide cross-linking agent (b) preferably has a 10-hour half-life temperature of 130° C. or lower. The peroxide cross-linking agent (b) more preferably has a 10-hour half-life temperature of 100° C. or lower. In addition, the peroxide cross-linking agent (b) preferably has a 10-hour half-life temperature of 50° C. or higher from the viewpoint of storage stability, the securing of time for filling materials and the like. The peroxide cross-linking agent (b) more preferably has a 10-hour half-life temperature of 70° C. or higher.

As the peroxide cross-linking agent, a peroxyketal, a dialkyl peroxide, a peroxyester, a ketone peroxide, a peroxycarbonate, a peroxydicarbonate, a diacyl peroxide, a hydroperoxide and the like are exemplified.

As the peroxyketal, 1,1-di(tert-butylperoxy)cyclohexane, 2,2-di(tert-butylperoxy)ethane, n-butyl 4,4-di(tert-butylperoxy)valerate, 1,1-di(tert-amylperoxy)cyclohexane and the like are exemplified.

As the dialkyl peroxide, dicumyl peroxide, 2,5-dimethyl-2,5-di(tert-butylperoxy)hexane, di-tert-butyl peroxide, 2,5-dimethyl-2,5-di(tert-butylperoxy)hexyne-3, di-tert-amyl peroxide and the like are exemplified.

As the peroxyester, 3-hydroxy-1,1-dimethylbutyl peroxyneodecanoate, α-cumyl peroxyneodecanoate, 1,1,3,3-tetramethylbutyl peroxyneodecanoate, 1,1,3,3-tetramethylbutyl peroxy-2-ethylhexanoate, tert-butyl peroxyneodecanoate, tert-butyl peroxyvivarate, tert-butyl peroxyisobutyrate, tert-butyl peroxy-2-ethyl hexanoate, tert-butyl peroxyacetate, tert-butyl peroxybenzoate, tert-amyl peroxyneodecanoate, tert-amyl peroxypivarate, tert-amyl peroxyisobutyrate, tert-amyl peroxy-2-ethylhexanoate, tert-amyl peroxyacetate, tert-amyl peroxybenzoate and the like are exemplified.

As the ketone peroxide, methyl ethyl ketone peroxide, methyl propyl ketone peroxide, methyl n-butyl ketone peroxide, methyl isobutyl ketone peroxide, methyl amyl ketone peroxide, 2-decanone peroxide, diethyl ketone peroxide, acetylacetone peroxide, cyclohexanone peroxide, 3-methylcyclohexanone peroxide, 4-methylcyclohexanone peroxide, 3,3,5-trimethylcyclohexanone peroxide, cycloheptanone peroxide, cyclododecanone peroxide and the like are exemplified.

As the peroxycarbonate, tert-butyl peroxyisopropyl carbonate, tert-butyl peroxy-2-ethylhexyl carbonate, tert-amyl peroxyisopropyl carbonate, tert-amyl peroxy-2-ethylhexyl carbonate, 1,6-bis(tert-butylperoxycarbonyloxy)hexane, tert-hexyl peroxyisopropyl carbonate, tert-octyl peroxyisopropyl carbonate, tert-hexyl peroxy-2-ethylhexyl carbonate, tert-octyl peroxy-2-ethylhexyl carbonate, diethylene glycol-bis(tert-butylperoxycarbonate) and the like are exemplified. As the peroxydicarbonate, di(2-ethylhexyl)peroxydicarbonate, di(isobutyl) peroxydicarbonate and the like are exemplified.

As the diacyl peroxide, diisononanoyl peroxide, dilauroyl peroxide, dibenzoyl peroxide and the like are exemplified. As the hydroperoxide, 1,1,3,3-tetramethylbutyl hydroperoxide, tert-butyl hydroperoxide, tert-amyl hydroperoxide and the like are exemplified.

The content of the peroxide cross-linking agent (b) is not particularly limited, but is set within a range of 0.1 to 10 parts by mass with respect to 100 parts by mass of the organopolysiloxane having an alkenyl group (a). The content of the peroxide cross-linking agent (b) is preferably within a range of 0.2 to 5.0 parts by mass, more preferably within a range of 0.3 to 3.0 parts by mass, and still more preferably within a range of 0.3 to 1.0 part by mass with respect to 100 parts by mass of the organopolysiloxane having an alkenyl group (a).

The heat stabilizer (c) includes the compound represented by general formula (1). The heat stabilizer (c) may be composed only of the compound represented by general formula (1) or may include a component other than the compound represented by general formula (1). The compound represented by general formula (1) is assumed to allow for both the securing of time for filling materials and an improvement in productivity which is achievable due to a short curing time when the compound represented by general formula (1) has a phenolic hydroxyl group and a (meth)acryloyl group, and the (meth)acryloyl group captures a free radical generated from the peroxide cross-linking agent and is converted to a more stable phenoxy radical. When the heat stabilizer is an ordinary phenolic antioxidant having only a phenolic hydroxyl group and having no (meth)acryloyl group, it is not possible to allow for both the securing of time for filling materials and an improvement in productivity which is achievable due to a short curing time. The securing of time for filling materials refers to the fact that time of approximately 30 seconds during which the materials are capable of flowing at molding temperatures is secured. In addition, since the compound represented by general formula (1) is excellent in terms of dispersibility in compositions including an organopolysiloxane (silicone rubber), silicone rubber compositions including the compound represented by general formula (1) as the heat stabilizer are excellent in terms of the reproducibility of curing properties. The reproducibility of curing properties refers to the fact that the reproducibility of a curing rate (T90–T10) is excellent. The reproducibility of the curing rate (T90–T10) can be evaluated from the standard deviation (variation) of the curing rate (T90–T10). T90 is time (s) taken for 90% of the maximum torque to be reached at each molding temperature, and T10 is time (s) taken for 10% of the maximum torque to be reached at each molding temperature.

In the silicone rubber composition according to the disclosure, the curing properties (T10 and T90–T10) can be adjusted by adjusting the content of the compound represented by general formula (1). When the content of the compound represented by general formula (1) is increased, it is possible to extend time spent until the beginning of curing (T10). In addition, when the content of the compound represented by general formula (1) is decreased, it is possible to shorten the curing rate (T90–T10).

The content of the compound represented by general formula (1) is preferably 0.1 parts by mass or more with respect to 100 parts by mass of the organopolysiloxane having an alkenyl group (a). The content of the compound represented by general formula (1) is more preferably 0.2 parts by mass or more and still more preferably 0.3 parts by mass or more of the (a). When the content is 0.1 parts by mass or more with respect to 100 parts by mass, it is easy to secure the time for filling materials by extending the time spent until the beginning of curing (T10). In addition, the content of the compound represented by general formula (1) is preferably 1.0 parts by mass or less with respect to 100 parts by mass of the organopolysiloxane having an alkenyl group (a). The content of the compound represented by general formula (1) is more preferably 0.8 parts by mass or less and still more preferably 0.5 parts by mass or less. When the content is preferably 1.0 part by mass or less with respect to 100 parts by mass of the (a), it is easy to secure the curing rate by shortening the curing rate (T90–T10).

Examples of the compound represented by general formula (1) include 2-[1-(2-hydroxy-3,5-di-tert-pentylphenyl)ethyl]-4,6-di-tert-pentylphenyl acrylate and 2-[1-(2-hydroxy-3,5-di-tert-pentylphenyl)ethyl]-4,6-di-tert-pentylphenyl methacrylate where $R_1$ represents a methyl group and $R_2$, $R_3$, $R_4$, and $R_5$ each represent a tert-pentyl group, 2-[1-(2-hydroxy-3,5-di-tert-butylphenyl)ethyl]-4,6-di-tert-butylphenyl acrylate and 2-[1-(2-hydroxy-3,5-di-tert-butylphenyl)ethyl]-4,6-di-tert-butylphenyl methacrylate where $R_1$ represents a methyl group and $R_2$, $R_3$, $R_4$, and $R_5$ each represent a tert-butyl group, 2-[1-(2-hydroxy-3-tert-butyl-5-methylphenyl)ethyl]-4-methyl-6-tert-butylphenyl acrylate, 2-[1-(2-hydroxy-3-tert-butyl-5-methylphenyl)ethyl]-4-methyl-6-tert-butylphenyl methacrylate where $R_1$ represents a methyl group, $R_2$ and $R_5$ each represent a tert-butyl group, and $R_3$ and $R_4$ each represent a methyl group, and the like. Among these, 2-[1-(2-hydroxy-3,5-di-tert-pentylphenyl)ethyl]-4,6-di-tert-pentylphenyl acrylate is particularly preferable from the viewpoint of easy dispersion in the organopolysiloxane, excellent workability, and the like.

The silicone rubber composition according to the disclosure may further contain, in addition to the (a), (b) and (c), (d) an organopolysiloxane having a phenyl group. In such a case, the dispersibility of the compound represented by general formula (1) improves, and the reproducibility of curing properties is more favorable. The (d) is distinguished from the (a) and is an organopolysiloxane having no alkenyl group.

The (d) has, in addition to the phenyl group, an organic group other than a phenyl group. The organic group is a monovalent substituted or unsubstituted hydrocarbon group. As the unsubstituted hydrocarbon group, an alkyl group such as a methyl group, an ethyl group, a propyl group, a butyl group, a hexyl group or a dodecyl group is exemplified. As the substituted hydrocarbon group, a chloromethyl group, a 3,3,3-trifluoropropyl group and the like are exemplified. As the organopolysiloxane, ordinarily, an organopolysiloxane having a methyl group as the organic group is frequently used from the viewpoint of easiness in synthesis or the like. The organopolysiloxane is preferably a linear organopolysiloxane, but may be a branched or cyclic organopolysiloxane.

The (d) may be an organopolysiloxane having a phenyl group only in a side chain, may be an organopolysiloxane having phenyl groups at both terminals or a phenyl group at a single terminal or may be an organopolysiloxane having phenyl groups in a side chain and at a terminal.

As the organopolysiloxane having a phenyl group (d), organopolysiloxanes having a structure represented by general formula (2) can be exemplified.

[Chem. 3]

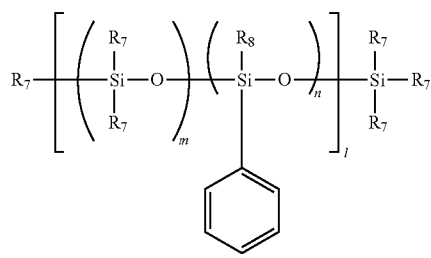

(2)

In formula (2), $R_7$ is an alkyl group, $R_8$ is an alkyl group or a phenyl group, and m, n and l are each the number of repeating units and one or more. In formula (2), $R_7$ is preferably a methyl group or an ethyl group and more preferably a methyl group. In formula (2), $R_8$ is preferably a methyl group, an ethyl group or a phenyl group and more preferably a phenyl group. In formula (2), m is preferably 8 to 350. In formula (2), n is preferably 1 to 3. In formula (2), l is preferably 1 to 50. A copolymer of formula (2) may be any of a random copolymer, an alternating copolymer, a periodic copolymer and a block copolymer. In formula (2), the phenyl group may be a phenyl group having a substituent. As the substituent, an alkyl group, an aryl group and the like are exemplified.

The (d) may be a liquid type, a millable type or both. The (d) is preferably a liquid type. The liquid-type organopolysiloxane is an organopolysiloxane having self-fluidity at room temperature (25° C.). The liquid-type organopolysiloxane is an organopolysiloxane having a viscosity at 25° C. of 100 to 500 mPa·s or higher.

The content of the (d) is preferably 1.0 part by mass or more with respect to 100 parts by mass of the organopolysiloxane having an alkenyl group (a) from the viewpoint of an improvement in the dispersibility of the compound represented by general formula (1) and more favorable reproducibility of curing properties. The content of the (d) is more preferably 2.0 parts by mass or more. In addition, the content of (d) is preferably 20 parts by mass or less with respect to 100 parts by mass of the organopolysiloxane having an alkenyl group (a) from the viewpoint of the physical strengths or the like of molded products. The content of the (d) is more preferably 10 parts by mass or less.

To the silicone rubber composition according to the disclosure, an additive that can be added to silicone rubber can be added as necessary as long as the disclosure is not impaired. As the additive, a reinforcing agent, a conductive agent, a filler, a cross-linking accelerator, a cross-linking retarder, a cross-linking aid, a scorch inhibitor, an anti-aging agent, a softener, a plasticizer, a lubricant, a flame retardant, a flame retardant aid, a UV absorber, a corrosion inhibitor, a foaming agent and the like are exemplified. As the conductive agent, conventionally well-known conductive agents such as an electronic conductive agent (carbon black, graphite, c-$TiO_2$, c-ZnO or c-$SnO_2$ (c- indicates "conductive")), an ionic conductive agent (a quaternary ammonium salt, a quaternary phosphonium salt, a borate, a surfactant or the like) are exemplified.

The silicone rubber composition according to the disclosure can be molded by being poured into a molding mold, being heated and cured (crosslinked) and then being released from the mold. Therefore, a silicone rubber crosslinked body composed of a crosslinked body of the silicone rubber composition of the disclosure can be obtained. The silicone rubber composition of the disclosure may be a non-foaming body or a foaming body.

The silicone rubber composition according to the disclosure can be preferably used as a material of waterproof sealants for vehicles such as automobiles. A sealant according to the disclosure is composed of a crosslinked body of the silicone rubber composition of the disclosure. The sealant according to the disclosure may be a non-foaming body or a foaming body.

According to the silicone rubber composition having the above-described configuration, since the silicone rubber composition contains the organopolysiloxane having an alkenyl group (a), the peroxide cross-linking agent (b), and the heat stabilizer (c), and the (c) includes a compound represented by general formula (1), the silicone rubber composition allows for both the securing of time for filling materials and an improvement in productivity which is achievable due to a short curing time and has excellent reproducibility of curing properties.

EXAMPLES

Hereinafter, the disclosure will be described in detail using examples and comparative examples.

Example 1

An organopolysiloxane having an alkenyl group, a peroxide cross-linking agent, a heat stabilizer and an organopolysiloxane having a phenyl group were kneaded using a kneader as per the composition (parts by mass) shown in Table 1, thereby preparing a silicone rubber composition.

Example 2

A silicone rubber composition was prepared in the same manner as in Example 1 except that the organopolysiloxane having a phenyl group was not blended.

Examples 3 and 4

Silicone rubber compositions were prepared in the same manner as in Example 2 except that the organopolysiloxane having an alkenyl group was changed.

Examples 5 and 6

Silicone rubber compositions were prepared in the same manner as in Example 2 except that the amount of the peroxide cross-linking agent blended was changed.

Examples 7 and 8

Silicone rubber compositions were prepared in the same manner as in Example 2 except that the amount of the heat stabilizer blended was changed.

Example 9

A silicone rubber composition was prepared in the same manner as in Example 2 except that the peroxide cross-linking agent was changed and the amount of the heat stabilizer blended was changed.

Comparative Examples 1 and 3

Silicone rubber compositions were prepared in the same manner as in Example 2 except that the heat stabilizer was changed.

Comparative Example 2

A silicone rubber composition was prepared in the same manner as in Example 2 except that the heat stabilizer was not blended.

Materials used in the examples and the comparative examples are as described below.

(a) Organopolysiloxanes Having an Alkenyl Group (a-1): Side chain vinyl group-containing dimethyl polysiloxane ("VDT-163" manufactured by Gelest, Inc.), viscosity at 25° C. of 2,000,000 to 4,000,000 mPa·s (a-2): Side chain vinyl group-containing dimethyl polysiloxane ("VDT-954" manufactured by Gelest, Inc.), viscosity at 25° C. of 300,000 to 500,000 mPa·s (a-3): Both terminal vinyl group-containing dimethyl polysiloxane ("SF3000E-150000 cP" manufactured by KCC), viscosity at 25° C. of 100,000 to 200,000 mPa·s (b) Peroxide Cross-Linking Agents (b-1): "KAYALENE 6-70" manufactured by Kayaku Nouryon Corporation, 10-hour half-life temperature: 97° C.

(b-2): "PERHEXA V" manufactured by NOF Corporation, 10-hour half-life temperature: 104.5° C.

(c) Heat Stabilizers (c-1): "MileOx 549 (GS)" manufactured by MP1 Chemie BV, 2-[1-(2-hydroxy-3,5-di-tert-pentylphenyl)ethyl]-4,6-di-tert-pentylphenyl acrylate 4-Hydroxy-TEMPO: "ADK STAB LA-7RD" manufactured by ADEKA Corporation Phenolic antioxidant: "ADK STAB AO-40" manufactured by ADEKA Corporation (d) Organopolysiloxane Having a Phenyl Group (d-1): "KF-53" manufactured by Shin-Etsu Chemical Co., Ltd.

(Curing properties)

The curing properties of the silicone rubber composition of each of Examples 1 to 9 and Comparative Examples 1 to 3 were measured with CURELASTOMETER 7 manufactured by JSR Corporation under a temperature condition of 170° C. For the curing properties, time taken for 10% of the maximum torque to be reached was regarded as the curing beginning time (T10), a difference (T90–T10) between time taken for 90% of the maximum torque to be reached (T90) and T10 was regarded as the curing rate, and T10 and T90–T10 were calculated. Silicone rubber compositions with a curing beginning time (T10) of shorter than 25 seconds were evaluated as poor (X), silicone rubber compositions with a curing beginning time (T10) of 25 seconds or longer and shorter than 30 seconds were evaluated as favorable (○), and silicone rubber compositions with a curing beginning time (T10) of 30 seconds or longer were evaluated as particularly favorable (⊙). In addition, silicone rubber compositions with a curing rate (T90–T10) of longer than 50 seconds were evaluated as poor (X), silicone rubber compositions with a curing rate (T90–T10) of longer than 45 and 50 seconds or shorter were evaluated as favorable (○), and silicone rubber compositions with a curing rate (T90–T10) of 45 seconds or shorter were evaluated as particularly favorable (⊙).

(Reproducibility of Curing Properties)

The curing rate (T90–T10) of the silicone rubber composition having the same composition was calculated five times, and the reproducibility was evaluated from the standard deviation s. Silicone rubber compositions with a standard deviation s of longer than 10 seconds were evaluated as poor (X), silicone rubber compositions with a standard deviation s of longer than 5 seconds and 10 seconds or shorter were evaluated as favorable (A), silicone rubber compositions with a standard deviation s of longer than 3 seconds and 5 seconds or shorter were evaluated as particularly favorable (O), and silicone rubber compositions with a standard deviation s of 3 seconds or shorter were evaluated as most favorable (O).

TABLE 1

| | | Example | | | | | | | | | Comparative Example | | |
|---|---|---|---|---|---|---|---|---|---|---|---|---|---|
| | | 1 | 2 | 3 | 4 | 5 | 6 | 7 | 8 | 9 | 1 | 2 | 3 |
| Organopolysiloxane having alkenyl group | a-1 (Viscosity: 3,000,000 mPa·s, side chain) | 100 | 100 | — | — | 100 | 100 | 100 | 100 | 100 | 100 | 100 | 100 |
| | a-2 (Viscosity: 400,000 mPa·s, side chain) | — | — | 100 | — | — | — | — | — | — | — | — | — |
| | a-3 (Viscosity: 1,500,000 mPa·s, both terminals) | — | — | — | 100 | — | — | — | — | — | — | — | — |
| Peroxide cross-linking agent | b-1 (10 h half-life: 97° C.) | 0.6 | 0.6 | 0.6 | 0.6 | 0.4 | 0.8 | 0.6 | 0.6 | — | 0.6 | 0.6 | 0.6 |
| | b-2 (10 h half-life: 104.5° C.) | — | — | — | — | — | — | — | — | 0.6 | — | — | — |
| Heat stabilizer | c-1 (MileOx 549 (GS)) | 0.4 | 0.4 | 0.4 | 0.4 | 0.4 | 0.4 | 0.25 | 0.5 | 0.15 | — | — | — |
| | 4-Hydroxy TEMPO | — | — | — | — | — | — | — | 0.15 | — | 0.15 | — | — |
| | Phenolic antioxidant | — | — | — | — | — | — | — | — | — | — | — | 0.4 |
| Organopolysiloxane having phenyl group (d-1) | | 2.0 | — | — | — | — | — | — | — | — | — | — | — |
| | T10 | ⊙ | ⊙ | ○ | ⊙ | ⊙ | ○ | ○ | ⊙ | ⊙ | ⊙ | X | X |
| | T90-T10 | ⊙ | ⊙ | ⊙ | ○ | ○ | ⊙ | ⊙ | ○ | ○ | ⊙ | ⊙ | X |
| | Reproducibility | ⊙ | O | Δ | Δ | O | O | O | O | O | X | ⊙ | O |

In the silicone rubber composition that was crosslinked with a peroxide of Comparative Example 2, no heat stabilizer was blended. Therefore, when a peroxide cross-linking agent having a relatively low decomposition temperature was selected, the time taken until the completion of curing became short, but the time spent until the beginning of curing was too short, curing proceeded until a mold was filled with the material, and molding became difficult. In the silicone rubber composition that was crosslinked with a peroxide of Comparative Example 1, 4-hydroxy-TEMPO was used as the heat stabilizer. Therefore, the curing properties (T10 and T90−T10) were favorable, but there was difficulty in the reproducibility of the curing properties. In the silicone rubber composition that was crosslinked with a peroxide of Comparative Example 3, an ordinary phenolic antioxidant was used as the heat stabilizer. Therefore, when a peroxide cross-linking agent having a relatively low decomposition temperature was selected, the time taken until the completion of curing became short, but the time spent until the beginning of curing was too short, curing proceeded until the mold was filled with the material, and molding became difficult.

On the other hand, in the silicone rubber compositions that were crosslinked with a peroxide of Examples 1 to 9, the compound represented by general formula (1) was used as the heat stabilizer. Therefore, the curing properties (T10 and T90−T10) were favorable, and the reproducibility of the curing properties was also excellent. That is, both the securing of time for filling the material and an improvement in productivity which was achievable due to a short curing time were allowed for, and the reproducibility of the curing properties was excellent.

In addition, from the comparison between Example 1 and the other examples, it is found that, when the silicone rubber composition further contains an organopolysiloxane having a phenyl group, the reproducibility of the curing properties improves. In addition, from the comparison of Examples 2 to 4, it is found that the curing rate (T90−T10) improves with the alkenyl group of the organopolysiloxane having an alkenyl group present in a side chain compared with the alkenyl group at a terminal. In addition, from the comparison between Examples 2 and 3, it is found that, when the viscosity of the organopolysiloxane having an alkenyl group is high, a shear force is likely to be exerted during kneading, the dispersibility of the compound represented by general formula (1) improves, and the reproducibility of the curing properties is more favorable.

Hitherto, the embodiment and examples of the disclosure have been described, but the disclosure is not limited to the above-described embodiment and examples by any means and can be modified in a variety of manners within the scope of the gist of the disclosure.

What is claimed is:

1. A silicone rubber composition comprising:
   (a) an organopolysiloxane having an alkenyl group;
   (b) a peroxide cross-linking agent;
   (c) a heat stabilizer; and
   (d) an organopolysiloxane having a phenyl group and having no alkenyl group,
   wherein (c) the heat stabilizer comprises a compound represented by general formula (1), and
   (d) the organopolysiloxane having a phenyl group and having no alkenyl group has a structure represented by general formula (2),

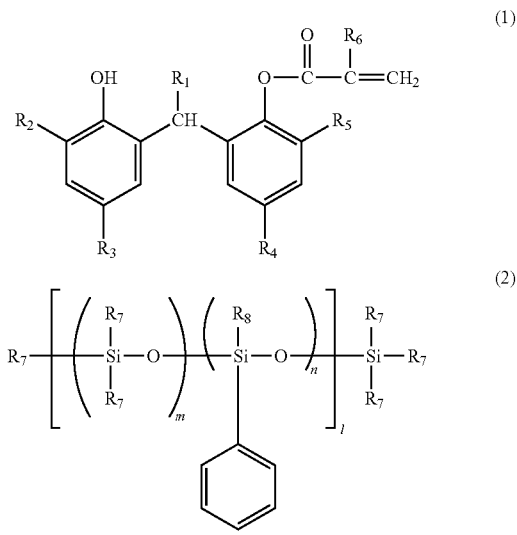

in formula (1), $R_1$ represents hydrogen or a methyl group, $R_2$, $R_3$, $R_4$, and $R_5$, each independently represent a C1-9 alkyl group, and $R_6$ represents hydrogen or a methyl group, and in formula (2), $R_7$ represents an alkyl group, $R_8$ represents an alkyl group or a phenyl group, and m, n and l each represents a number of repeating units and one or more.

2. The silicone rubber composition according to claim 1, wherein (a) the organopolysiloxane having an alkenyl group comprises an organopolysiloxane having an alkenyl group in a side chain.

3. The silicone rubber composition according to claim 1, wherein (a) the organopolysiloxane having an alkenyl group comprises an organopolysiloxane having a viscosity at 25° C. of 100,000 mPa·s or higher.

4. A silicone rubber crosslinked body that is a crosslinked body of the silicone rubber composition according to claim 1.

5. A sealant that is composed of a crosslinked body of the silicone rubber composition according to claim 1.

* * * * *